United States Patent
Nakata et al.

(10) Patent No.: US 10,453,490 B2
(45) Date of Patent: Oct. 22, 2019

(54) OPTICAL DISC DEVICE

(71) Applicant: Panasonic Intellectual Property Management Co., Ltd., Osaka (JP)

(72) Inventors: Kohei Nakata, Nara (JP); Tsuyoshi Nakasendo, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/223,698

(22) Filed: Dec. 18, 2018

(65) Prior Publication Data

US 2019/0189154 A1  Jun. 20, 2019

(30) Foreign Application Priority Data

Dec. 19, 2017 (JP) .................................. 2017-242276
Oct. 30, 2018 (JP) .................................. 2018-204273

(51) Int. Cl.
G11B 20/10 (2006.01)
G11B 7/0045 (2006.01)

(52) U.S. Cl.
CPC ........ G11B 20/1037 (2013.01); G11B 7/0045 (2013.01)

(58) Field of Classification Search
None
See application file for complete search history.

(56) References Cited

U.S. PATENT DOCUMENTS

| 8,370,692 | B2 * | 2/2013 | Hwang | G11B 7/00736 714/744 |
| 8,988,800 | B1 * | 3/2015 | Varnica | G11B 20/1833 360/31 |
| 9,396,062 | B1 * | 7/2016 | Sridhara | G06F 11/1068 |
| 2002/0060871 | A1 * | 5/2002 | Hamaguchi | G11B 5/012 360/48 |
| 2005/0139698 | A1 | 6/2005 | Potz et al. | |
| 2007/0006052 | A1 * | 1/2007 | Blum | G11B 20/1833 714/699 |
| 2012/0023284 | A1 * | 1/2012 | Wu | G06F 11/1068 711/103 |
| 2017/0262338 | A1 | 9/2017 | Nakata et al. | |
| 2018/0129566 | A1 | 5/2018 | Nakata et al. | |
| 2019/0189154 | A1 * | 6/2019 | Nakata | G11B 20/1037 |

FOREIGN PATENT DOCUMENTS

JP    2017-168175    9/2017
WO   2004/001219    12/2003

* cited by examiner

*Primary Examiner* — Peter Vincent Agustin
(74) *Attorney, Agent, or Firm* — Wenderoth, Lind & Ponack, L.L.P.

(57) ABSTRACT

An optical disc device includes a first error correction coding circuit that codes the recording data according to a first error correction coding format, a second error correction coding circuit that codes the recording data according to a second error correction coding format, and a recorder that converts the recording data into a recording signal and records it on an optical disc. The second error correction coding format is different in an arrangement of the recording data from the first error correction coding format. The second error correction coding format is configured to generate a second parity code with a higher degree of redundancy. The recorder records the recording data coded by the first error correction coding circuit and only the second parity code in the recording data coded by the second error correction coding circuit.

8 Claims, 5 Drawing Sheets

OPTICAL DISC DEVICE

CROSS REFERENCE TO RELATED APPLICATIONS

This application is based on Japanese Patent Application (No. 2017-242276) filed on Dec. 19, 2017 and Japanese Patent Application (No. 2018-204273) filed on Oct. 30, 2018, the contents of which are incorporated herein by reference.

BACKGROUND OF THE INVENTION

1. Field of the Invention

The present disclosure relates to an optical disc device which records and reproduces data on and from an optical disc and relates to an optical disc on which data is recorded optically.

2. Description of the Related Art

At present, many kinds of optical discs such as a DVD and a Blu-ray (registered trademark) disc (hereinafter abbreviated as BD) are being used as information recording media for storing videos, data, etc. Among techniques for increasing the recording capacity per volume without raising the cost of an optical disc which are important from the viewpoint of space efficiency of data storage are a technique for increasing the track density and a technique for increasing the line density.

On the other hand, in the field of optical discs, a technique that error correction is performed in units of a prescribed block (refer to WO2004/001219). If the surface of an optical disc has a scratch or a speck of dust is placed on it, errors may occur continuously. If a very large number of errors exist (including continuous ones), it is highly probable that they cannot be corrected by error correction. One measure that is taken in this case is to record data of a block concerned newly in a separately provided replacement track.

Although various attempts have been made to increase the recording density of optical discs to increase their recording capacity, increase in density causes increase in the number of bit errors occurring in reproduction. For example, JP-A-2017-168175 discloses an error correction code technique that is improved in error correction ability.

SUMMARY OF THE INVENTION

The present disclosure provides an optical disc device that enables stable reproduction of data recorded on a high-density optical disc and efficient use of its recording capacity.

The present disclosure discloses an optical disc device which records and reproduces recording data on or from tracks on an optical disc in units of a prescribed block. The optical disc device includes a first error correction coding circuit that codes the recording data according to a first error correction coding format; a second error correction coding circuit that codes the recording data according to a second error correction coding format; and a recorder that converts the recording data coded by the first error correction coding circuit or the recording data coded by the second error correction coding circuit into a recording signal and records the recording signal on the optical disc. The second error correction coding format is different in an arrangement of the recording data from the first error correction coding format, and the second error correction coding format is configured to generate a second parity code with a higher degree of redundancy than in a case that the recording data is coded according to the first error correction coding format. The recorder records the recording data coded by the first error correction coding circuit and only the second parity code in the recording data coded by the second error correction coding circuit.

The optical disc device according to the disclosure that enables stable reproduction of data recorded on a high-density optical disc and efficient use of its recording capacity.

DETAILED DESCRIPTION OF THE EXEMPLARY EMBODIMENTS

An embodiment will be hereinafter described in detail by referring to the accompanying drawings when necessary. However, unnecessarily detailed descriptions may be avoided. For example, detailed descriptions of well-known items and duplicated descriptions of constituent elements having substantially the same ones already described may be omitted. These are to prevent the following description from becoming unnecessarily redundant and thereby facilitate understanding of those skilled in the art.

The following description and the accompanying drawings are provided to allow those skilled in the art to understand the disclosure sufficiently and are not intended to restrict the subject matter set forth in the claims.

EMBODIMENT

[1. Configuration]

Figure 1:
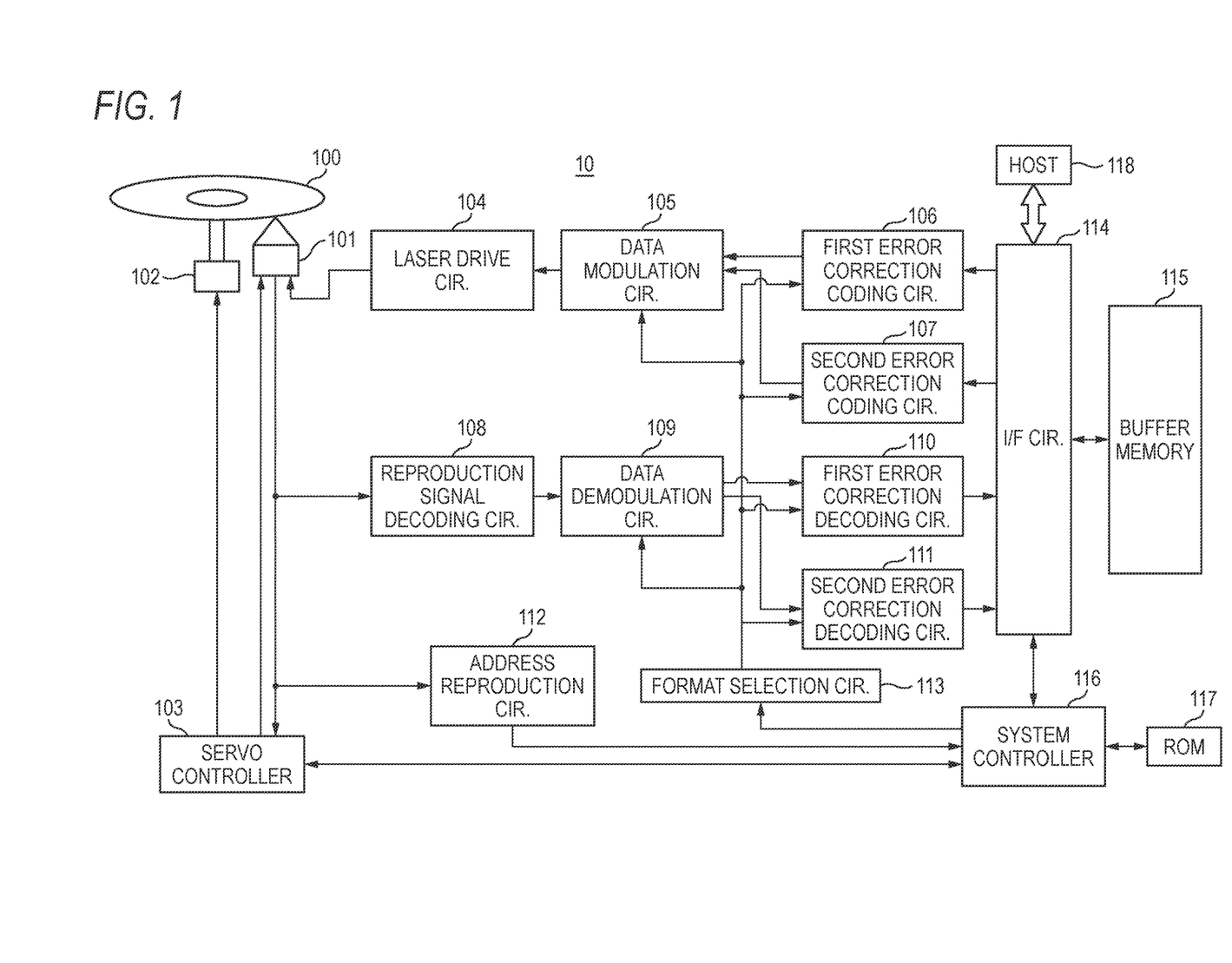
FIG. 1 is a block diagram showing the configuration of an optical disc device according to an embodiment.

FIG. 1 shows the configuration of an optical disc device 10 according to the embodiment. As shown in FIG. 1, the optical disc device 10 includes an optical head 101, a spindle motor 102, a servo controller 103, a laser drive circuit 104, a data modulation circuit 105, a first error correction coding circuit 106, a second error correction coding circuit 107, a reproduction signal decoding circuit 108, a data demodulation circuit 109, a first error correction decoding circuit 110, a second error correction decoding circuit 111, an address reproduction circuit 112, a format selection circuit 113, an I/F circuit 114, a buffer memory 115, a system controller 116, and a ROM (read-only memory) 117.

The optical disc device 10 performs recording and reproducing user data on and from an optical disc 100. The optical disc 100 is formed with tracks spirally from the inner circumference to the outer circumference. The tracks consist of groove tracks which are in groove form and land tracks each of which is formed between adjacent ones of the groove tracks. User data are recorded in both of groove tracks and land tracks.

The spindle motor 102 rotates the optical disc 100. The optical head 101 records user data on the optical disc 100 and reproduces user data from the optical disc 100 by applying a light beam to the optical disc 100.

By controlling the optical head 101 and the spindle motor 102, the servo controller 103 performs a control for scanning the tracks while focusing a light beam applied to the optical disc 100 from the optical head 101 on a track formed on the optical disc 100 and a movement control for accessing a target track. The servo controller 103 controls the position of the optical head 101 and the rotation speed of the spindle motor 102 so that the optical disc 100 is scanned with the optical head 101 at a prescribed linear velocity.

The I/F circuit 114 receives user data to be recorded on the optical disc 100 from a host 118 and stores it in the buffer memory 115. And the I/F circuit 114 sends, to the host 118, user data that has been reproduced from the optical disc 100 and is stored in the buffer memory 115. Furthermore, the I/F circuit 114 sends user data or the like stored in the buffer memory 115 to another internal unit and, conversely, stores user data or the like received from another internal unit to the buffer memory 115.

The first error correction coding circuit 106 adds error correction parity codes to user data received from the I/F circuit 114 and thereby generates first coded data of a first format (an example of a first error correction coding format).

The second error correction coding circuit 107 receives, from the I/F circuit 114, the same user data as received by the first error correction coding circuit 106 and generates, as second coded data, error correction parity codes according to a second format (an example of a second error correction coding format).

The data modulation circuit 105 receives the first coded data from the first error correction coding circuit 106 or the second coded data from the second error correction coding circuit 107, and generates a modulated signal by modulating the received coded data according to a prescribed modulation rule. This modulated signal is recorded on tracks of the optical disc 100. The selection between the first format and the second format is controlled by the format selection circuit 113.

The laser drive circuit 104 converts the modulated signal into optical pulses so that marks are formed correctly on the optical disc 100, and drives a laser of the optical head 101. Marks are formed on the optical disc 100 by heat of laser light applied.

On the other hand, user data recorded on the optical disc 100 is reproduced by the reproduction signal decoding circuit 108, the data demodulation circuit 109, the first error correction decoding circuit 110, and the second error correction decoding circuit 111.

The optical head 101 applies a light beam to the optical disc 100, detects reflection light from the optical disc 100, and outputs a reproduction signal on the basis of the detected reflection light.

The reproduction signal decoding circuit 108 generates a decoded signal by decoding the reproduction signal that is output from the optical head 101. More specifically, this is done by a PRML signal processing technique in which a closest expected value waveform is selected by comparing the reproduction signal with expected value waveforms and a binary signal as a base of the selected expected value waveform is output as a decoded signal. Reproduction performance capable of accommodating a high line density can be attained by employing a condition that the inter-code interference width is set long.

The data demodulation circuit 109 demodulates first coded data or second coded data from the decoded signal.

The selection between the first format and the second format is controlled by the format selection circuit 113.

The first error correction decoding circuit 110 recovers the user data by correcting an error(s), if any, in the demodulated first coded data.

The second error correction decoding circuit 111 recovers the user data by correcting an error(s), if any, in the first coded data using the second coded data as parity codes.

The address reproduction circuit 112 reproduces address information from a wobble signal that reflects track snaking of the optical disc 100 and is detected by the optical head 101, and outputs the reproduced address information. Each track of the optical disc 100 is snaked at a prescribed pitch and includes address information in such a manner that the prescribed pitch is modulated to indicate a position of the track.

The format selection circuit 113 selects an error correction coding format for coded data that is to be or is recorded on tracks of the optical disc 100. The first error correction coding circuit 106, the second error correction coding circuit 107, the data modulation circuit 105, the first error correction decoding circuit 110, the second error correction decoding circuit 111, and the data demodulation circuit 109 operate according to the selected error correction coding format.

The ROM 117, which is a flash memory, is stored with programs according to which the system controller 116 controls the overall optical disc device 10.

The system controller 116 controls the individual circuits and also controls communication with the host 118 by reading running the programs stored in the ROM 117 and running them. In FIG. 1, for the sake of convenience, arrows to indicate controls that the system controller 116 performs on the constituent elements other than the format selection circuit 113 are omitted. The system controller 116 of the optical disc device 10 according to the embodiment determines a zone on the optical disc 100 on the basis of address information that is output from the second error correction decoding circuit 111, and controls the format selection circuit 113 so that coded data is recorded in an error correction coding format suitable for the determined zone.

Figure 2:
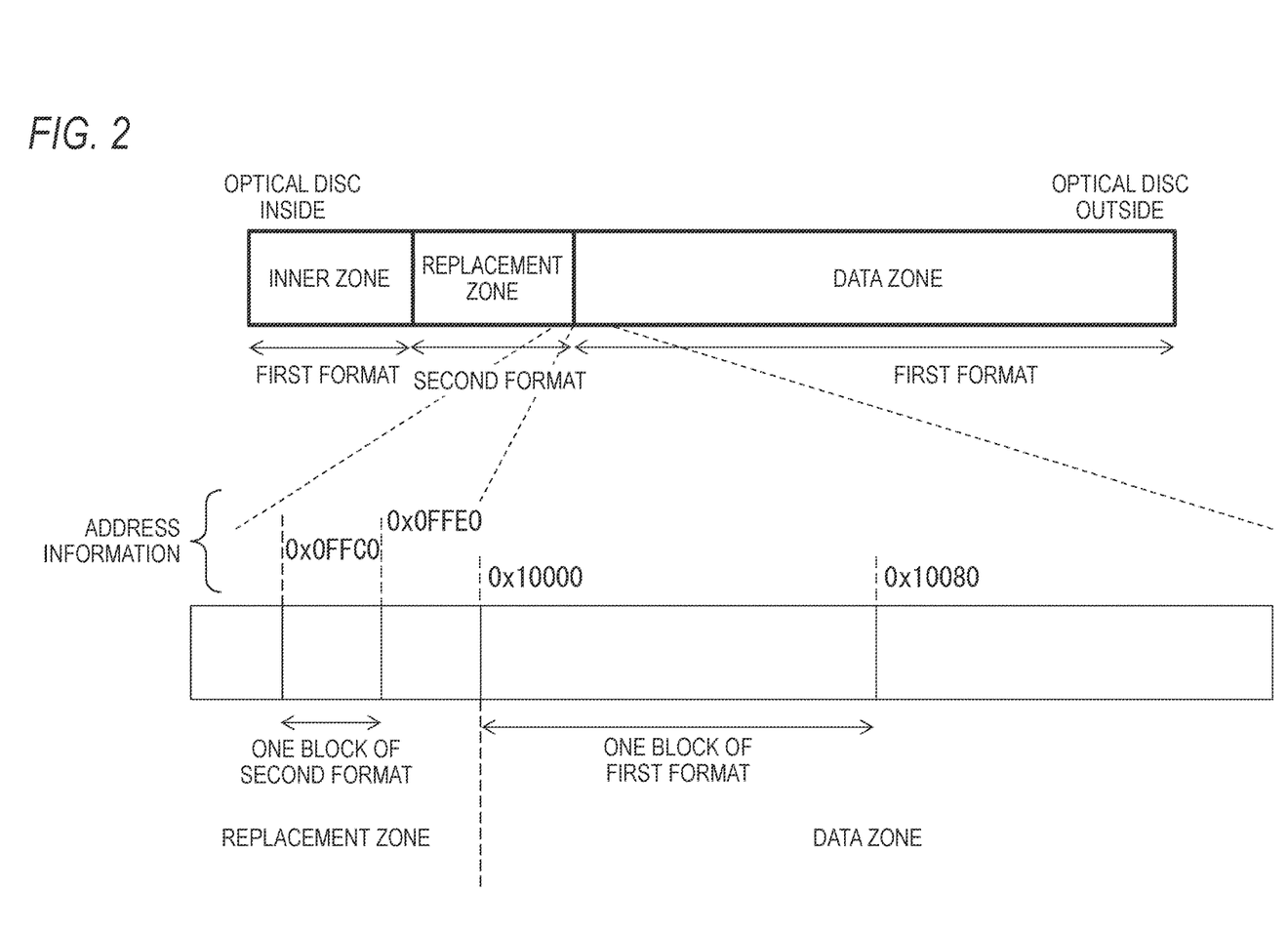
FIG. 2 shows the structure of zone-dependent formats on the optical disc.

FIG. 2 shows the structure of zone-dependent formats on the optical disc 100. An inner zone in which management information etc. to be used for managing the track use situation etc. of the optical disc 100 is to be recorded is located adjacent to the inner circumference of the optical disc 100. A replacement zone for replacement recording is located outside the inner zone. When there is a probability that error correction cannot be performed by the first error correction decoding circuit 110 due to, for example, continuous errors caused by a scratch or a speck of dust, second coded data generated by the second error correction coding circuit 107 is recorded in the replacement zone according to the second format to enable error correction of data of a related block.

The remaining zone outside the replacement zone is a data zone in which user data transmitted from the host 118 is to be recorded. In the data zone, the first format is used as the coding format. The system controller 116 controls the format selection circuit 113 so that it switches the coding format depending on whether the recording target zone is the data zone or the replacement zone.

Figure 3:
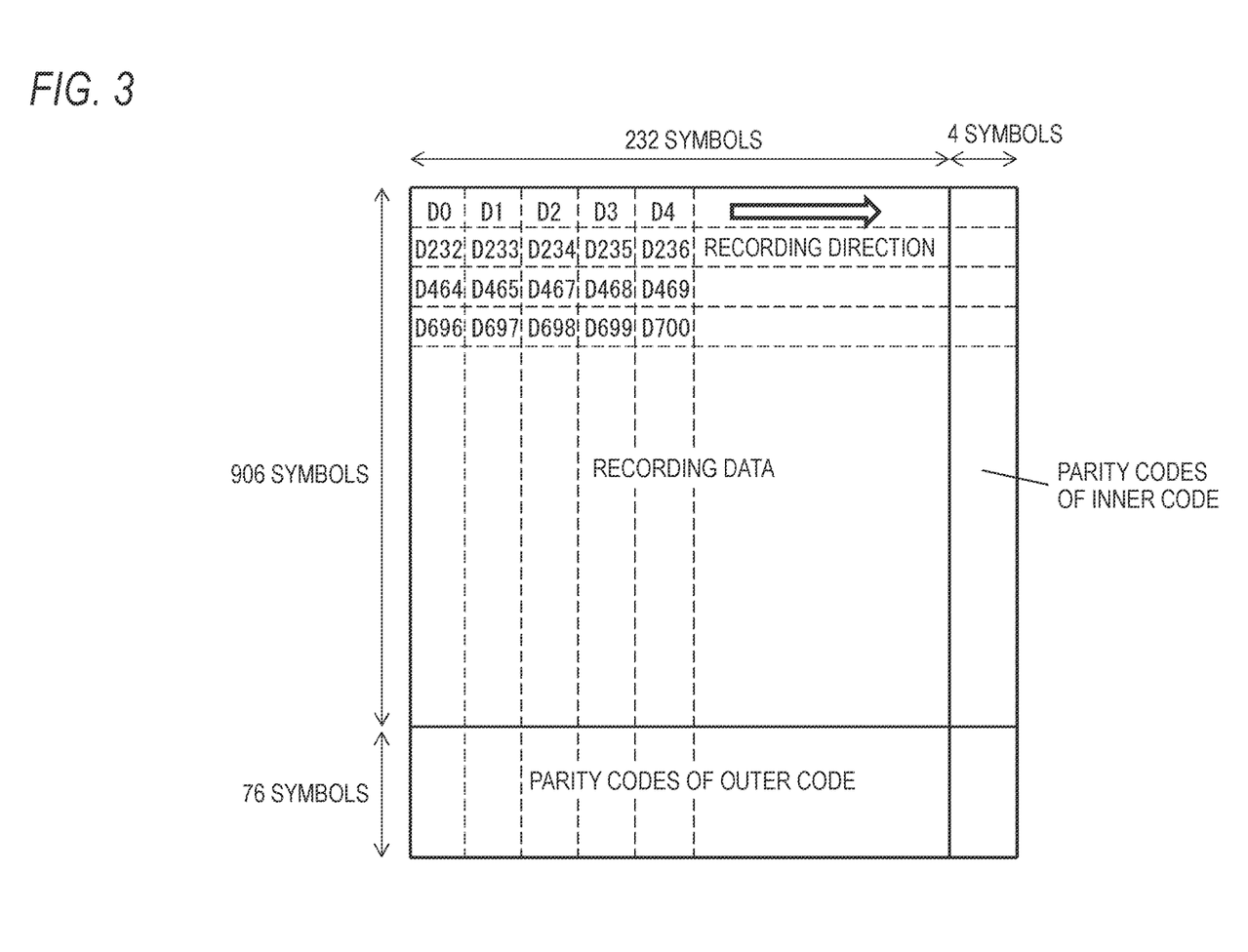
FIG. 3 shows the structure of a first format.

FIG. 3 shows the structure of the first format according to which coding is performed by the first error correction coding circuit 106 in units of a data block. The error correction code is a Reed-Solomon product code in which one symbol consists of 10 bits. Parity codes of an inner code of four symbols are added to recording data of 232 symbols to constitute the inner code. Parity codes of an outer code of 76 symbols are added to recording data of 906 symbols to constitute the outer code. As a result, the number of inner codes per data block is equal to 906+76=982 and the number of outer codes per data block is equal to 232+4=236. One data block includes recording data of 906×232=210,192 symbols, that is, 210,192 (symbols)×10 (bits)÷8 (bits)=262,740 bytes.

User data that is transmitted from the host 118 is added with 4-byte error detection parity code per 2,048 bytes in the first error correction coding circuit 106 and thereby comes to be of 2,052 bytes. One hundred twenty-eight sets of 2,052 bytes mean 262,656 bytes. Control data such as address information indicating a recording position and an error correction parity code for the control data, which total 84 bytes, are further added to form recording data of 262,740 bytes. The recording data of 262,740 bytes is coded according to the first format of the above-mentioned Reed-Solomon product code to become a first coded data. The control data is an example of side information.

As shown in FIG. 3, data of 262,656 bytes consisting of user data and control data is divided into symbols Dn of 10 bits and are arranged in order (D0, D1, D2, . . . ) in the inner code direction. The first inner code consists of data D0 to D231 and a parity code of four symbols, and the second inner code consists of data D232 to D463 and a parity code of four symbols. The first outer code consists of head symbols of the respective inner codes, D0, D232, D464, . . . , and a parity code of 76 symbols, and the second outer code consists of second symbols of the respective inner codes, D1, S233, D465, . . . , and a parity code of 76 symbols. The first format is used in recording first coded data.

In the first format, inner codes are arranged in order, that is, the first inner code, the second inner code, . . . , in such a manner that the inner code direction coincides with the track recording direction. The first coded data is modulated according to the RLL (run-length limited) (1, 10) modulation rule in such a manner that one code of each inner code of the Reed-Solomon product code format shown in FIG. 3 is made one frame. A sync pattern (12T) that is not included in the modulation rule is added at the head of each frame so that the frequency characteristic of a modulated signal does not include a low-frequency component. Furthermore, DC control bits for making the ratio between a mark and a space uniform are inserted at a prescribed interval.

The number of frames (982 frames) is equal to the number of inner codes. A runin region having a prescribed length is added at the head of each data block and a runout region having a prescribed length is added at the end of each data block. The runin region is a region that is used in the reproduction signal decoding circuit 108 to, for example, control the amplitude of a reproduction signal so that stable signal processing can be performed from the head frame. The runout region is a buffer region for preventing overlap or formation of a gap between the data blocks when the next data block is recorded.

Figure 4:
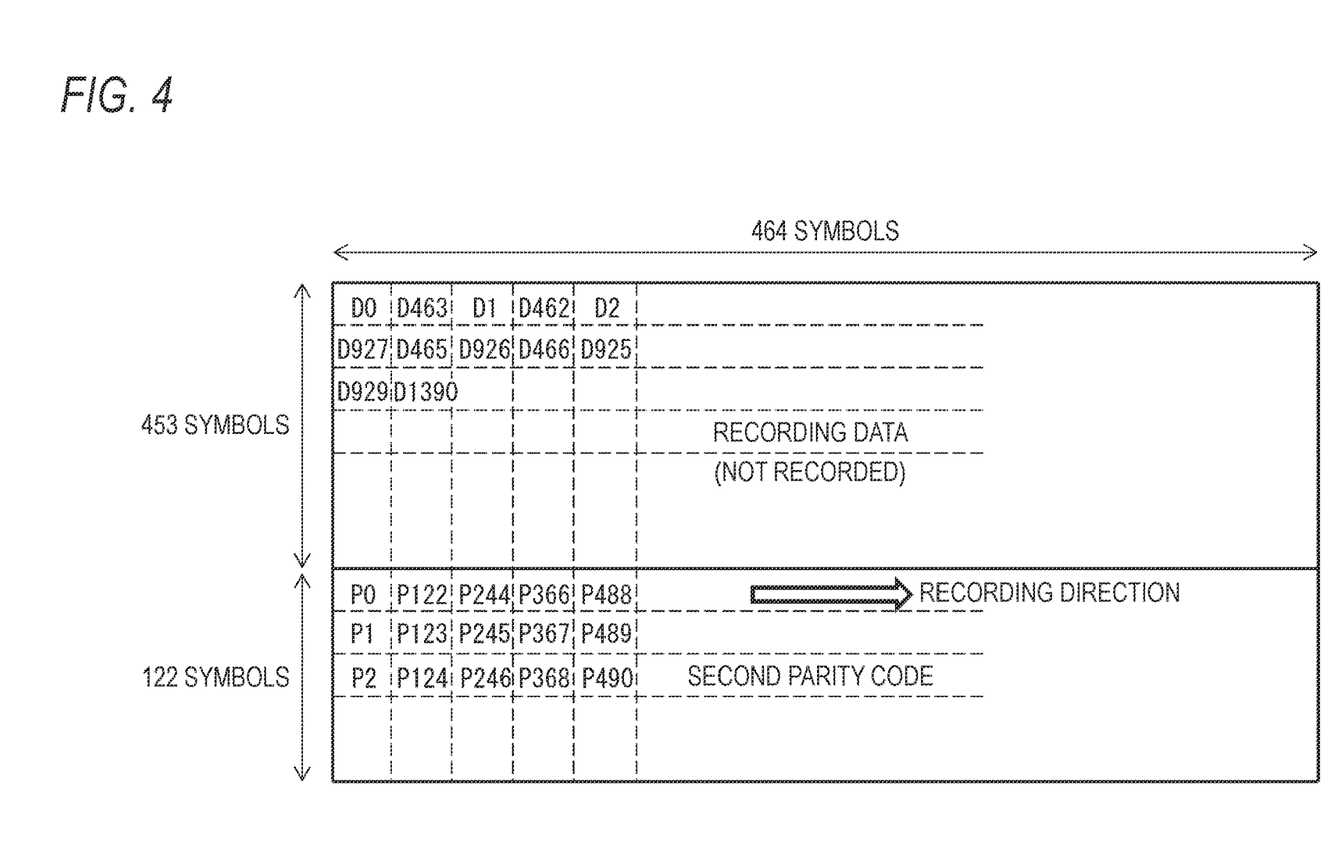
FIG. 4 shows the structure of a second format.

FIG. 4 shows the structure of the second format according to which coding is performed by the second error correction coding circuit 107 in units of a data block. As in the case of the first error correction coding circuit 106, the error correction code is a Reed-Solomon product code in which one symbol consists of 10 bits. Unlike in the first format, the Reed-Solomon product code employed is not a product code. The number of symbols in the horizontal direction is 464 which is two times as large as in the first format. In the vertical direction, a second parity code of 122 symbols to recording data of 453 symbols. The number of parity codes of the second format is equal to 56,608 symbols and is 2.6 times as large as the number of parity codes of the first format which is equal to 21,560 symbols. In the horizontal direction, recording data are arranged in order of D0, D463, D1, D462, . . . which is different from the order of the recording data, that is, different from the order D1, D1, D2, . . . that is employed in the first format. A parity code is generated as a code in the vertical direction for each arrangement of recording data symbols in the vertical direction.

As in the first format, in the second format recording is done in such a manner that the horizontal direction is coincides with the track recording direction. Whereas in the first format both of recording data and parity codes are recorded, in the second format only parity codes are recorded (i.e., recording data are not recorded). The second parity codes are modulated according to the RLL modulation rule in order of P0, P122, P244, . . . in such a manner that 232 symbols constitute one frame. A sync pattern (12T) that is not included in the modulation rule is added at the head of each frame. DC control bits for making the ratio between a mark and a space uniform are inserted at a prescribed interval so that the frequency characteristic of a modulated signal does not include a low-frequency component. Furthermore, DC control bits for making the ratio between a mark and a space uniform are inserted at a prescribed interval.

Two hundred forty-four frames are formed which include parity codes of 56,608 symbols and control data of 976 symbols which are address information indicating recording positions and other information. As in the first format, a runin region having a prescribed length is added at the head of each data block and a runout region having a prescribed length is added at the end of each data block.

The runin region and the runout region are added in the same manner in the first format and the second format so as to have a length of two frames in total. Thus, each data block of the first format has a length of 984 frames and each data block of the second format has a length 246 frames which is ¼ of the data block length of the first format.

As shown in FIG. 2, each block data of the first format is assigned address information in units of 0x80 and each block data of the second format is assigned address information in units of 0x20.

Although the recording/reproduction data block length is switched between the replacement zone (second format) and the data zone (first format), the relationship between the physical position on a track of the optical disc and the address information is kept the same. Thus, even if data blocks straddle the boundary between the replacement zone and the data zone, the system controller 116 can access a data block at any position on the optical disc 100 using address information obtained from the address reproduction circuit 112.

[2. Operation]

Next, the operation of the optical disc device 10 according to the embodiment will be described.

First, a description will be made of a recording operation that is performed on a track in the data zone of the optical disc 100 by the optical disc device 10 according to the embodiment.

The I/F circuit 114 acquires user data transmitted from the host 118 and recording destination logical addresses. The user data is divided into data blocks of a size that conforms to the first format and sent to the first error correction coding circuit 106 one data block after another.

The first error correction coding circuit 106 generates first coded data by adding a parity code for correction of an error that may occur at the time of reproduction to user data of each data block.

The data modulation circuit 105 modulates the parity codes-added first coded data into a modulated signal of the first format according to the prescribed modulation rule.

To form recording marks on the optical disc 100 correctly, the laser drive circuit 104 converts the modulated signal into a castle-type pulse waveform and outputs a laser drive signal to the optical head 101.

The optical head 101 records marks corresponding to the modulated signal on the optical disc 100 by applying laser light pulses to it at positions corresponding to recording destination logical addresses.

The system controller 116 controls the above recording operation. The system controller 116 determines a recording position on the optical disc 100 on the basis of a recording destination logical address acquired by the I/F circuit 114 and moves the optical head 101 to a target position by controlling the servo controller 103. Before the optical head 101 reaches the target position (track), the system controller 116 instructs the format selection circuit 113 to select an operation of the first format and causes the first error correction coding circuit 106 to operate. According to an instruction from the format selection circuit 113, the data modulation circuit 105 outputs a modulated signal according to a first modulation format corresponding to the first format. When the optical head 101 has reached the target position, the system controller 116 performs recording by causing the data modulation circuit 105 and the laser drive circuit 104 to operate.

Next, a reproduction operation of the optical disc device 10 according to the embodiment will be described.

A reproduction position on the optical disc 100 is determined in the same manner as a recording position is determined in a recording operation. When the optical head 101 has reached a position of a data block to be reproduced, the system controller 116 performs reproduction of user data by causing the reproduction signal decoding circuit 108, the data demodulation circuit 109, the first error correction decoding circuit 110, and the format selection circuit 113 to operate.

The reproduction signal decoding circuit 108 selects a closest expected value waveform by comparing a reproduction signal with expected value waveforms, and outputs, as a decoded signal, a binary signal that is a base of the selected expected value waveform.

The data demodulation circuit 109 demodulates the decoded signal according to the first format and a prescribed demodulation rule, and the first error correction decoding circuit 110 recovers user data and control data by correcting errors in the demodulated coded data.

The first error correction decoding circuit 110 informs the system controller 116 of the number of errors it has corrected in the data block. For example, if continuous errors have occurred in a number that is larger than a first threshold value in a data block that was recorded according to the first format and the number of errors exceeds a prescribed number, the system controller 116 performs replacement recording on a track in the replacement zone that are different from the track of the data block recorded according to the first format. When the number of errors is beyond a prescribed condition, it is highly probable that first error correction decoding circuit 110 will not be able to correct them if the number of errors increases further. Thus, the system controller 116 performs a control so as to cause replacement recording in the replacement zone.

As shown in FIG. 3, in the first format, up to 38 symbols can be corrected by one outer codeword because each outer code parity code has 76 symbols. If an outer codeword has occurred that is associated with errors that are larger in number than 30 symbols, the system controller 116 judges that replacement recording should be performed. The system controller 116 also judges that replacement recording should be performed if continuous errors of 100 symbols or more arranged in the inner code direction exist in 20 (20 frames) or more inner codes in total. Replacement recording is performed when the condition involving a small number is met because continuous errors due to a scratch, a speck of dust, or the like may adversely affect not only a reproduction signal but also a focusing control and a tracking control for applying laser light to a track, thus increasing the number of errors.

Errors are corrected by the first error correction decoding circuit 110 and user data and control data of the block concerned are stored in the buffer memory 115. Reproduced user data is output to the host 118 via the I/F circuit 114.

The system controller 116 controls the above reproduction operation. The system controller 116 determines a reproduction position on the optical head 101 on the basis of a reproduction destination logical address acquired via the I/F circuit 114 and moves the optical head 101 to the target position by controlling the servo controller 103. Before the optical head 101 reaches the target position (track), the system controller 116 instructs the format selection circuit 113 to select an operation according to the first format. When the optical head 101 has reached the target position, the system controller 116 causes the reproduction signal decoding circuit 108 and the data demodulation circuit 109 and then the first error correction decoding circuit 110 to operate and thereby recover user data and control data. The recovered user data is stored in the buffer memory 115 and then sent to the host 118 via the I/F circuit 114. The reproduction operation is thus completed.

Next, a description will be made of how the optical disc device 10 according to the embodiment performs an operation of recording on tracks in the replacement zone of the optical disc 100.

As described above, replacement recording is performed on a track in the replacement zone when a reproduction result indicates that the number of errors is beyond the prescribed condition (a data block where the number of errors is beyond this condition is referred to as a "block X").

The second error correction coding circuit 107 generate second parity codes by performing coding, according to the second format, on user data of the block X that has been reproduced and stored in the buffer memory 115.

The data modulation circuit 105 modulates the second parity codes (second coded data) into a modulated signal of the second format according to the prescribed modulation rule.

The laser drive circuit 104 converts a modulated signal into a castle-type pulse waveform to form recording marks on the optical disc 100 correctly, and outputs a drive signal for driving the laser to the optical head 101.

The optical head 101 records marks corresponding to the modulated signal by applying laser light pulses to the optical disc 100 at positions corresponding to recording destination logical addresses.

As a result of the execution of the above operation, the second parity codes that have been added to the user data that is recorded as the block X are recorded in a track in the replacement zone. The system controller 116 controls the above recording operation. The system controller 116 determines recording positions in the replacement zone on the basis of management information that is already recorded in the inner zone and moves the optical head 101 to a target position by controlling the servo controller 103. Before the optical head 101 reaches the target position, the system controller 116 instructs the format selection circuit 113 to select an operation of the second format and causes the second error correction coding circuit 107 to operate. According to an instruction from the format selection circuit 113, the data modulation circuit 105 outputs a modulated signal according to a second modulation format corresponding to the second format. When the optical head 101 has reached the target position, the system controller 116 performs recording by causing the data modulation circuit 105 and the laser drive circuit 104 to operate. The system controller 116 updates the management information so that it includes address information indicating the position of the block X and address information indicating positions of the corresponding second parity codes in the replacement zone, and records the updated management information in the inner zone.

Next, a description will be made of how the optical disc device 10 according to the embodiment performs an operation of reproducing the block X using the second parity codes recorded in the replacement zone of the optical disc 100.

A request for reproducing the user data recorded as the block X comes from the host 118 via the I/F circuit 114. The system controller 116 confirms that second parity codes are recorded in the replacement zone for the block X on the basis of the management information that was acquired in advance.

The system controller 116 has the block X reproduced according to the first format by causing a reproduction operation as described above. Then the system controller 116 moves the optical head 101 to the position in the replacement zone where the second parity codes corresponding to the block X is recorded, and causes the reproduction signal decoding circuit 108 and the data demodulation circuit 109 to operate according to the second format through the format selection circuit 113. The system controller 116 thereafter causes the second error correction decoding circuit 111 to operate using the second parity codes demodulated by the data demodulation circuit 109 and the first coded data already stored in the buffer memory 115.

The second error correction decoding circuit 111 corrects the errors in the recording data (see FIG. 4) by a high correction ability using the second parity codes that provides high redundancy. If this operation leaves errors, the system controller 116 causes the first error correction decoding circuit 110 to operate, that is, causes them to perform error correction on outer codes and inner codes repeatedly, to correct all the errors. If errors remain even after the operation of the first error correction decoding circuit 110, the system controller 116 causes the second error correction decoding circuit 111 again, which enhances the correction ability further.

As shown in FIGS. 3 and 4, the recording data Dn are arranged differently and different sets of parity codes are generated in the first format and the second format. Thus, the error correction ability can be increased by successive repeated operations of the first error correction decoding circuit 110 and the second error correction decoding circuit 111.

If all the errors are corrected by the above operation, the system controller 116 sends the user data stored in the buffer memory 115 to the host 118 via the I/F circuit 114. The reproduction operation is thus completed.

Conventionally, replacement recoding in the replacement zone is performed according to the same format (i.e., first format) as recording in the data zone. In this case, the replacement zone is consumed in units of a data block of the first format. In contrast, in the embodiment, the length of the data block in the second format is ¼ of that in the first format, which means that the replacement zone can be used as if to have a size that is four times its actual size. Furthermore, the correction ability can be enhanced by virtue of increased redundancy.

The first format makes it possible to correct continuous errors of 8,986 symbols (236 symbols×38 frames) in the case where outer code parity codes are used fully. On the other hand, the second format makes it possible to correct continuous errors of 28,304 symbols (464×61) in the case where second parity codes are used fully. Although as such the second format makes it possible to correct continuous errors in a number that is about three times the number of continuous errors that can be corrected in the first format, continuous errors of an even larger number cannot always be corrected even with repeated processing. For example, the measure may be taken that when continuous errors have occurred in a data block recorded according to the first format in a number that is larger than the second threshold value or when defective portions similar to the continuous errors are detected, the system controller 116 may records the data coded according to the first format on a different track again which is different from a track where the data coded according to the first format has been recorded previously. The second threshold value is larger than the first threshold value.

More specifically, the following measure may be taken. Replacement recording using the second format is performed when continuous errors of more than 20 frames have occurred in the first format. And data including user data is recorded in another track according to the first format when a large defect that is difficult to correct even with second parity codes (e.g., continuous errors larger than 20,060 symbols (236 symbols×85 frames)) has occurred.

In the above-described operation according to the embodiment, where second parity codes are recorded in the replacement zone at a much different radial position, an operation of reciprocating the optical head 101 between tracks having much different radial positions is performed at the time of each of recording and reproduction. In this case, a control for increasing or decreasing the rotation speed of the spindle motor 102 is also performed to attain a prescribed linear velocity at each radial position. It takes a longer time to make such a movement or control than to record or reproduce the second parity codes. This raises a problem that it may take a long transfer time to record or reproduce user data in response to a request from the host 118.

Figure 5:
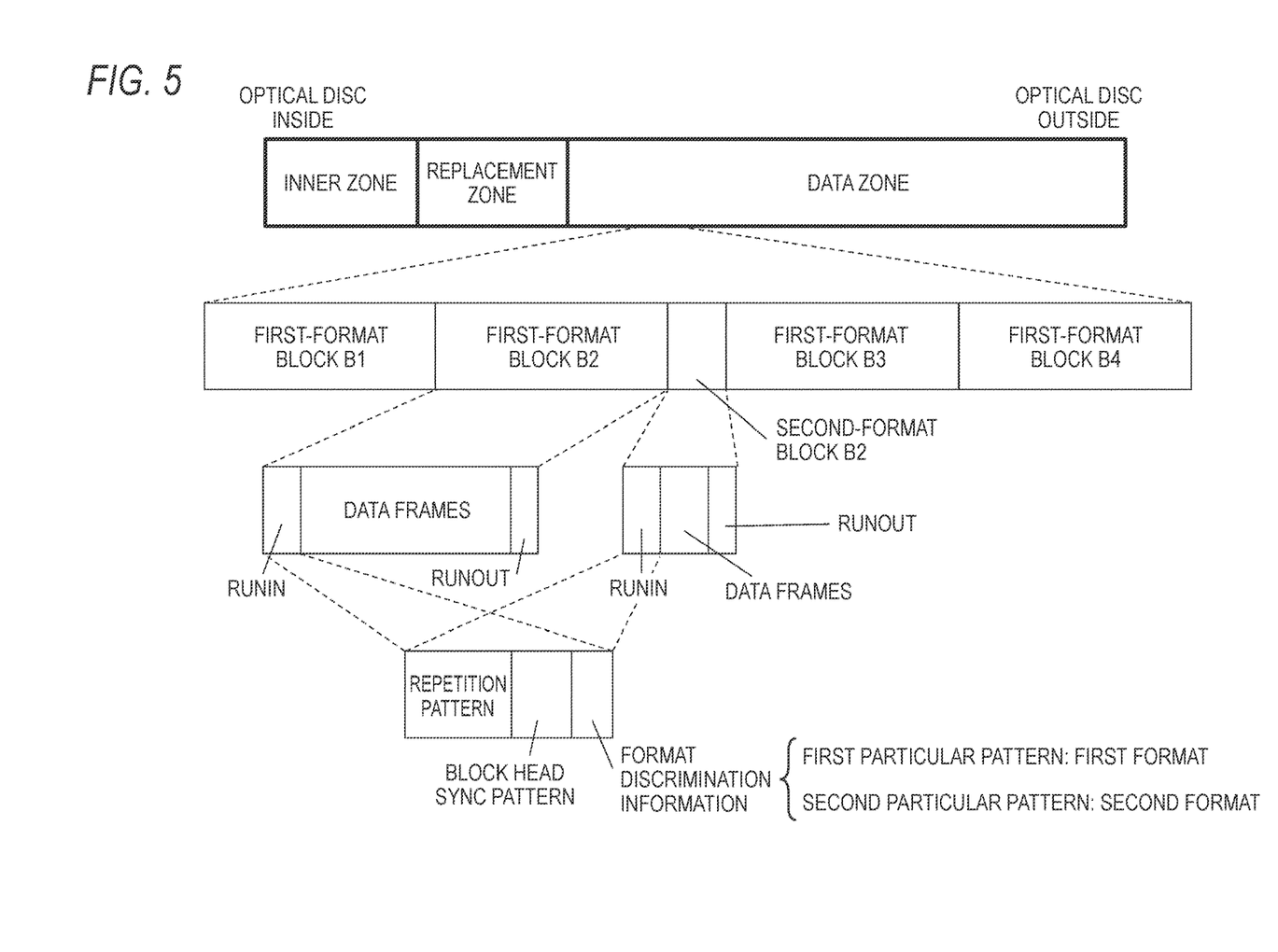
FIG. 5 shows the structure of zone-dependent formats on the optical disc that are employed in the case where a second-format block is recorded in a data zone.

To solve the above problem, second parity codes may be recorded in the data zone rather than the replacement zone. FIG. 5 illustrates a method for recording second parity codes (second-format block) in the data zone. FIG. 5 shows the structure of zone-dependent formats on the optical disc 100 that are employed in the case where a second-format block is recorded in the data zone.

In a data zone, in which to record user data, on the optical disc 100, a first-format block (an example of a first block) including first parity codes is recorded and a second-format block (an example of a second block) including second parity codes for the user data concerned is recorded at such a position as to follow the first-format block if a prescribed condition is satisfied.

When detecting defective portions or errors are detected in a number that is larger than or equal to a prescribed number in recording or reproducing a first-format block B2, the optical disc device 10 is recorded so that second parity codes (second-format block B2) for user data included in the first-format block B2 is located at such a position as to follow the first-format block B2. The second-format block B2 is recorded at a position where to record the first-format block B3 (next first-format block) usually and the first-format block B3 is recorded at such a position as to follow it.

For example, when continuous errors have occurred in a number that is larger than a first threshold value in a data block recorded according to the first format or when the defective portions similar to such continuous errors are detected, the optical disc device 10 records a second-format block B2 including second parity codes at such a position as to follow the first-format block B2.

Where only first-format blocks are recorded continuously, it suffices for the data demodulation circuit 109 to operate by determining head positions of the first-format blocks at constant intervals. On the other hand, where a second-format block is inserted between first-format blocks, it is necessary for the data demodulation circuit 109 to judge at the head position of each block whether the block is a first-format block or a second-format block.

As shown in FIG. 5, each of first-format block and the second-format block is configured to include a runin region, a data frame region, and a runout region. Coded user data and parity codes or only parity codes are recorded in the data frame region. The runin region includes a repetition pattern for stabilization control of the signal processing state of the reproduction signal decoding circuit 108, a block head sync pattern for determination of a block head position, and format discrimination information indicating whether the block is a first-format block or a second-format block.

The format discrimination information is a first particular pattern indicating that the format block is a first-format block or a second particular pattern indicating that the block is a second-format block. The runout region is a region for buffering with the following format block. The data demodulation circuit 109 can perform a reproduction operation on a first-format block or a second-format block according to a detection result of the format discrimination information.

The system controller 116 controls insert-recording of a second-format block according to a detection result of the number of defects or errors. For example, when continuous errors have occurred in a number that is larger than the first threshold value in recording a first-format block or when defective portions similar to the continuous errors are detected, the optical disc device 10 records a second-format block at such a position as to follow the first-format block.

At the time of reproduction, the system controller 116 causes the second error correction decoding circuit 111 to operate using the second parity codes according to a format discrimination information detection result of the data demodulation circuit 109 and a correction result of the first error correction decoding circuit 110. For example, the system controller 116 causes the first error correction decoding circuit 110 to perform an error correction operation. If errors remain, the system controller 116 causes reproduction of second parity codes recorded in the second-format block and causes the second error correction decoding circuit 111 to perform an error correction operation using the second parity codes.

By using format discrimination information in the above-described manner, it becomes possible to record and reproduce user data efficiently in a short time without requiring a time to move the optical head 101 or control the spindle motor 102. Since a second-format block is recorded at such a position as to follow a first-format block, at the time of reproduction, second parity codes can be acquired following first parity codes and error correction using the second parity codes can be performed. Thus, an error correction operation can be performed efficiently using the second parity codes even without the need for recording, as part of the management information of the optical disc 100, information indicating a block in which the second parity codes are recorded.

Whereas the embodiment realizes both of efficient use of a recording capacity and high reproduction performance using the data zone and the replacement zone in the single optical disc device 10 and the single optical disc 100, plural optical disc devices 10 and plural optical discs 100 may be used. The time taken to perform each of a recording operation and a reproduction operation can be shortened by separately providing a first optical disc on which user data is recorded according to the first format and a second optical disc on which second parity codes of the second format and management information relating to replacement recording are recorded. This is because individual operations can be performed in parallel in contrast to the case that a recording operation or a reproduction operation is performed while the optical head 101 is moved between the inner zone, the replacement zone, and the data zone of the optical disc 100.

Where plural optical discs 100 are used, the influence, on user data to be recorded, of a scratch or a speck of dust on the optical disc 100 can be divided into smaller parts by dividing the user data to be recorded into divisional data according to the number of optical discs 100 and recording the latter on the respective optical discs 100. That is, the error correction ability can be kept high by dividing a large number of continuous errors into smaller numbers of continuous errors.

[3. Advantages Etc.]

As described above, the optical disc 100 and the optical disc device 10 according to the embodiment make it possible to secure very high reproduction performance by using the replacement zone efficiently, for errors that tend to increase in number as the recording density increases. In particular, a high error correction ability can be attained by efficient operations by recording user data while adding second parity codes using the replacement zone or a subsequent block to deal with local errors such as a prescribed number or more of continuous errors.

Although the embodiment has been described above with reference to the drawings, it goes without saying that the invention is not limited to the embodiment. It is apparent that those skilled in the art would be able to conceive various changes and modifications within the confines of the claims. And such changes or modifications should naturally be construed as being included in the technical scope of the invention.

The present disclosure can be applied to optical discs and optical disc devices for data recording and reproduction.

What is claimed is:

1. An optical disc device which records and reproduces recording data on or from tracks on an optical disc in units of a prescribed block, the optical disc device comprising:

a first error correction coding circuit that codes the recording data according to a first error correction coding format;

a second error correction coding circuit that codes the recording data according to a second error correction coding format; and a recorder that converts the recording data coded by the first error correction coding circuit or the recording data coded by the second error correction coding circuit into a recording signal and records the recording signal on the optical disc, wherein the second error correction coding format is different in an arrangement of the recording data from the first error correction coding format, and the second error correction coding format is configured to generate a second parity code with a higher degree of redundancy than in a case that the recording data is coded according to the first error correction coding format; and wherein the recorder records the recording data coded by the first error correction coding circuit and only the second parity code in the recording data coded by the second error correction coding circuit.

2. The optical disc device according to claim 1, wherein when continuous errors have occurred in a number that is larger than a first threshold value in a coding according to the first error correction coding format, the recorder records the second parity code generated by the second error correction coding circuit on a different track being different from a track on which the recording data coded by the first error correction coding circuit is recorded.

3. The optical disc device according to claim 2, wherein when continuous errors have occurred in a number that is larger than a second threshold value that is larger than the first threshold value in the coding according to the first error correction coding format, the recorder records the recording data coded by the first error correction coding circuit again, separately on a different track being different from a track on which the recording data coded by the first error correction coding circuit have been recorded previously.

4. The optical disc device according to claim 2, wherein the recorder records, on the optical disc, management information indicating that the second parity code generated by the second error correction coding circuit is recorded on the different track.

5. The optical disc device according to claim 1, further comprising:

a first error correction decoding circuit that performs an error correction according to the first error correction coding format; and a second error correction decoding circuit that performs an error correction according to the second error correction coding format, wherein the recording data is recovered by performing the error correction by the first error correction decoding circuit and the error correction by the second error correction decoding circuit alternately and repeatedly.

6. The optical disc device according to claim 1, wherein when continuous errors have occurred in a number that is larger than a first threshold value in a coding according to the first error correction coding format, the recorder records the second parity code generated by the second error correction coding circuit on a second block at a position that follows a position where the recording data coded by the first error correction coding circuit is recorded as a first block.

7. The optical disc device according to claim 6, wherein the recorder records the first block and the second block in such a manner that the first block and the second block include a runin region indicating a block head, a data frame region including coded recording data, and a runout region indicating a block end; and wherein the runin region includes format discrimination information which has either a first particular pattern if the coded recording data included in the data frame region is recording data coded according to the first error correction coding format or a second particular pattern if the coded recording data included in the data frame region is a second parity code coded according to the second error correction coding format.

8. The optical disc device according to claim 7, further comprising:

a first error correction decoding circuit that performs an error correction according to the first error correction coding format; and a second error correction decoding circuit that performs an error correction according to the second error correction coding format, wherein at least one of the error correction by the first error correction decoding circuit and the error correction by the second error correction decoding circuit is performed in response to a result of reproduction of the format discrimination information included in the runin region.

* * * * *